9546X
J. C. Fletcher,
Double Reflecting Lamp,
Patented Mar. 30, 1836.
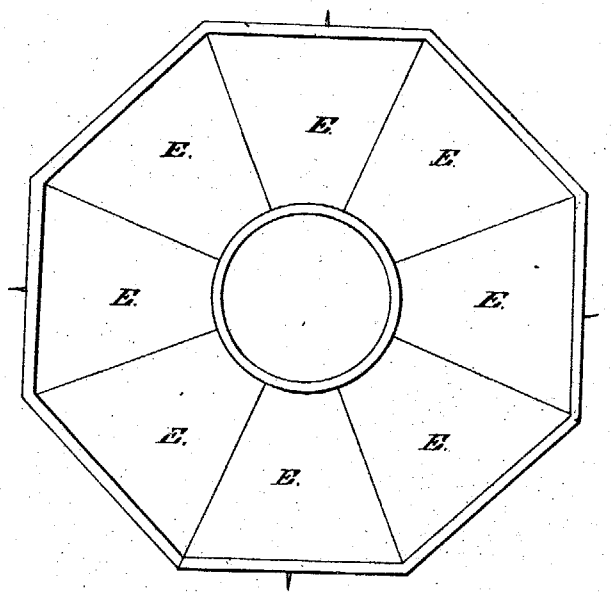
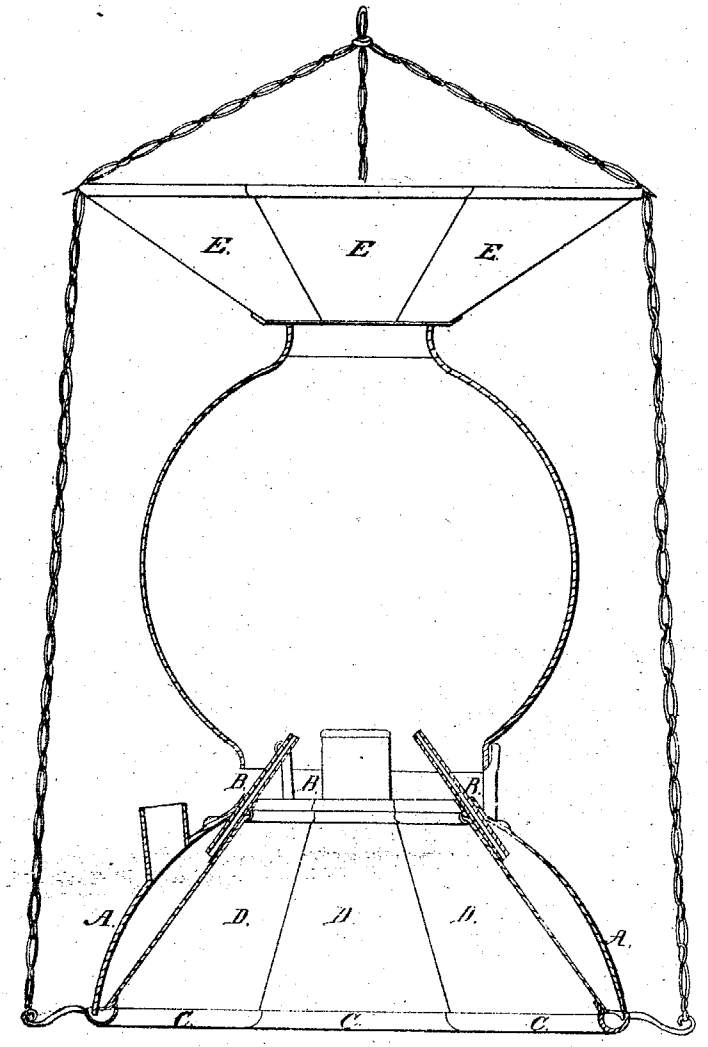

9546 X

Mar 30 1836

John C Fletcher of Springfield Township Ohio

Letters Patent

The Schedule referred to in these Letters Patent and making part of the same containing a description in the words of the said John C Fletcher himself of his improvement in the double reflecting Lamp Be it known that I John C Fletcher, of Springfield Township in the County of Clark and State of Ohio have invented a new and useful improvement in the Lamp, called "Fletchers Improved double reflecting Lamp" which is described as follows. The receptacle for the oil is made in the usual manner of spherical or polygonal concave figure having any convenient number of burners placed in an inclined position bringing the light to the apex with chains for suspending it, and a glass tube or chimney in the manner of Argands Lamp — My improvement consists in providing a receiver or trough for catching the overflowing oil which in the common Lamp usually falls on the floor or on the clothing of the company, this receiver is of the same figure as the lower edge of the lamp and the Lamp is suspended in it. the suspending chains are attached to the trough by brackets. Another improvement consists in arranging two sets of trapezoidal reflectors in a spherical or polygonal concave shape one placed above the light for reflecting it over the room, the other below it for concentrating the light — The reflectors above the light are placed in a metallic frame having an opening in the centre for the chimney and is suspended in the chains with the apex inverted or towards the light. The reflectors below the light are placed in the concave or inner side of the Lamp All that I claim as my invention and for which I solicit Letters Patent consists in the arrangement of the mirrors, and the receiver for catching the overflowing oil as before described.

Witnesses
Wm P Elliot
B K Morsell

John C Fletcher (Granted March 30 1836)